UNITED STATES PATENT OFFICE.

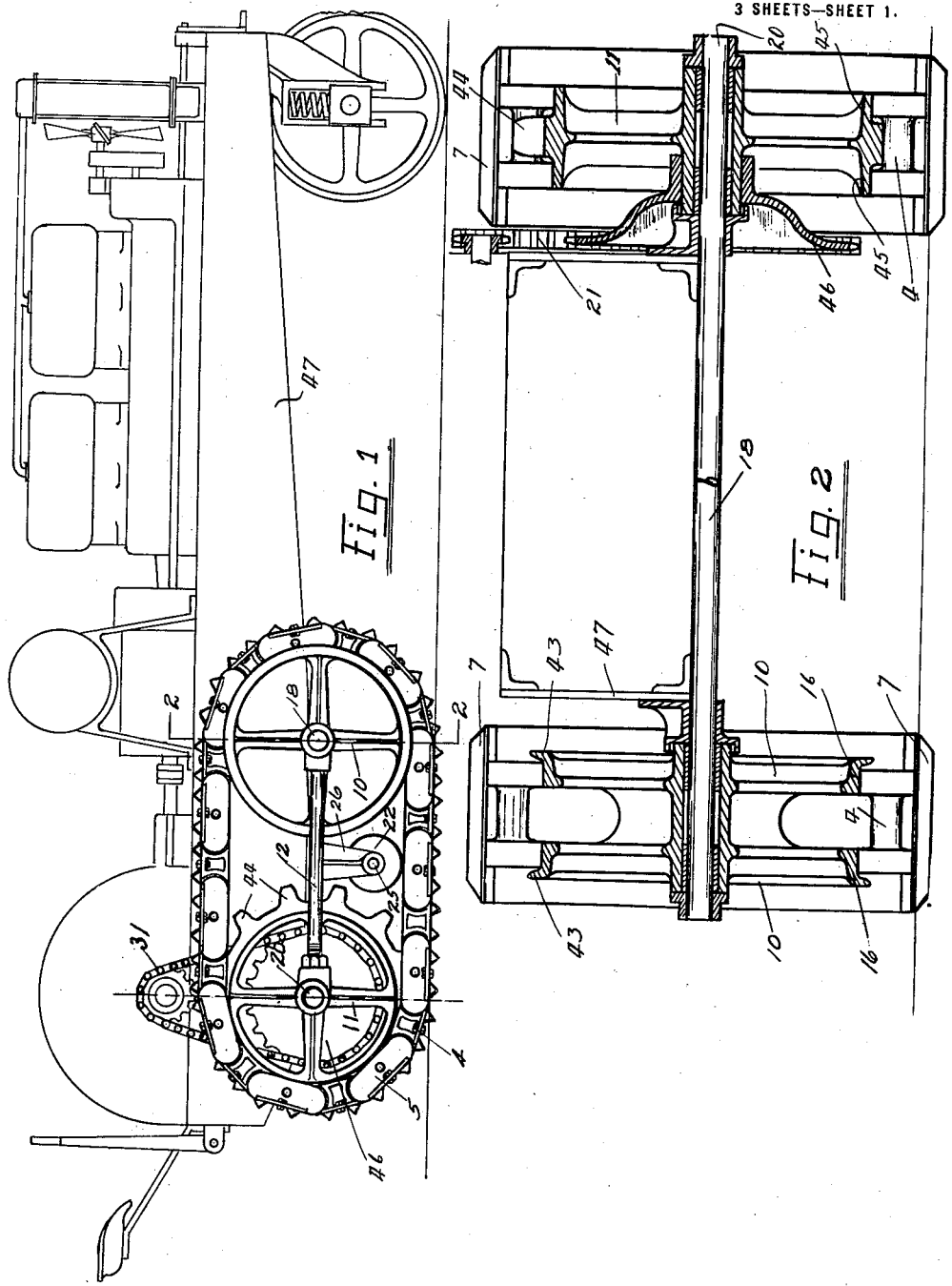

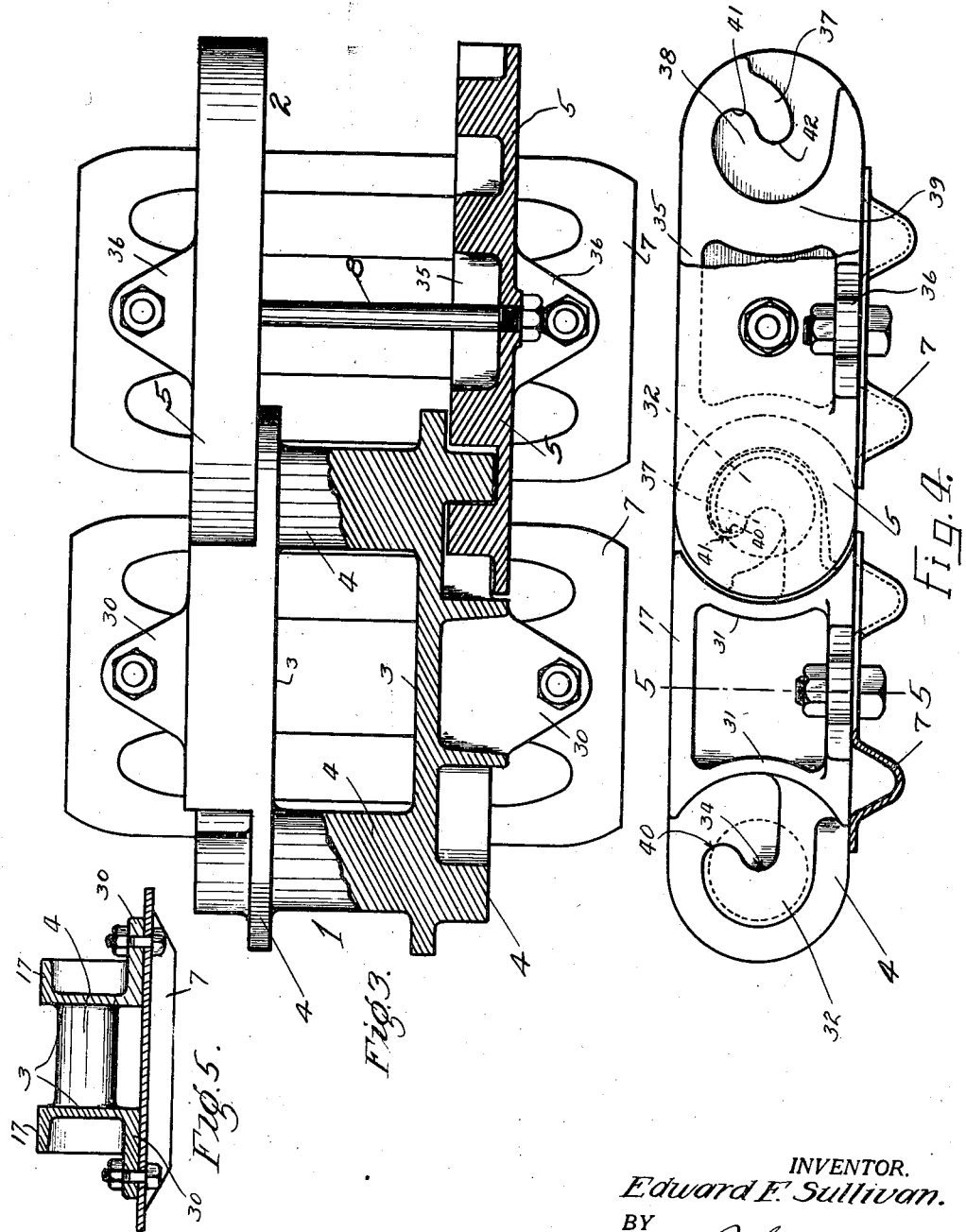

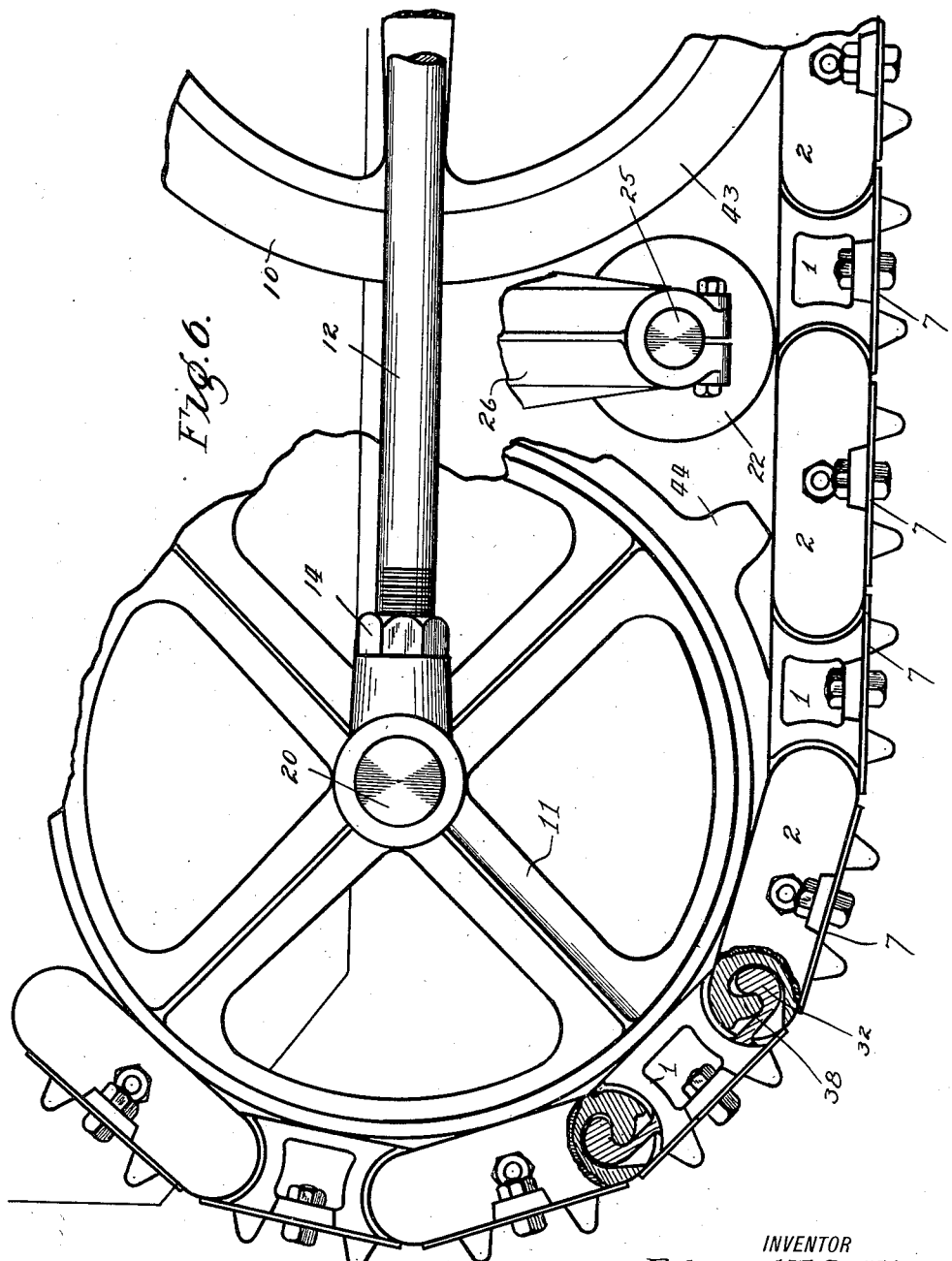

EDWARD F. SULLIVAN, OF OAKLAND, CALIFORNIA.

TRACTION BELT-CHAIN.

1,271,239.  Specification of Letters Patent.  Patented July 2, 1918.

Application filed May 5, 1915. Serial No. 25,981.

*To all whom it may concern:*

Be it known that I, EDWARD F. SULLIVAN, a citizen of the United States, residing at Oakland, in the county of Alameda and State of California, have invented certain new and useful Improvements in Traction Belt-Chains, of which the following is a specification.

This invention relates to improvements in tractors of the track laying type and more particularly to the endless belt chain, or track used thereon.

The principal object sought to be accomplished is to provide an endless flexible track chain comprising a series of intermeshing links adapted to encircle the supporting wheels attached to the tractor frame, and on which said wheels are adapted to roll.

Heretofore it has been the practice in tractor chain construction to provide the flexible track with separate pins for holding the links together, which practice opens to the objection that the pins work loose in their fastenings thereby causing undue torsional strain on the traction belt, causing the links to break under the strain. Experience demonstrates that it is impracticable to produce an entirely satisfactory tractor chain in which the spools and pins are separate from side links and my invention aims to overcome this objection.

Broadly the invention consists of a sprocket traction chain, the links of which are formed with intermeshing lugs to take care of the torsional and longitudinal strains, the outside links being held on the inside links by a bolt, the links having shoes or grousers of suitable width attached thereto to form a continuous supporting surface, and supporting wheels adapted to travel on said track sections.

Referring to the accompanying drawings forming a part of this specification,

Figure 1 is a view in side elevation illustrating a complete traction machine showing thereon the traction belt chain constructed in accordance with this invention.

Fig. 2 is a detail cross sectional view, one-half of the view being on the line 2—2, Fig. 1, and the other half being taken through the rear supporting wheel.

Fig. 3 is a detail plan view partly in section, showing a set of links.

Fig. 4 is a side elevation illustrating a set of friction links, one of the side bars being broken away to disclose the construction of the inner face of the opposite base.

Fig. 5 is a cross section on the line 5—5 of Fig. 4.

Fig. 6 is an enlarged view in side elevation of the drive sprocket showing the chain passing around the same and showing in section the position which the interlocking lugs assume in passing around the sprocket.

Referring to corresponding parts by the same numerals of reference, the chain is made up of pairs of links, denoted in general by 1 and 2. Links 1 are the connector links and comprise side bars 3 integrally connected by the cylindrical cross bars 4. Each of the side bars is substantially channel shaped in cross section, the lower flange being provided with laterally extending lugs 30 by which the shoe 7 is attached to the link.

Connecting the upper and lower flanges 17 of the side bars are arc shaped ribs 31 struck from a center in alinement with the axes of cross bars 4. Extending from this rib on each end of the link and formed on the face of side bars 3, is a lug 32 substantially shaped like the letter J, the bottom portions 34 alining with the axes of cross pieces 4 and being adapted to receive coacting lugs of link 2.

The latter consists of two separate side bars, each comprising the plate 5 having flanges 35, which also gives the link a channel section. Each side bar of the link is also provided with lugs 36 by which they are fastened to one of the shoes 7. The ends of side plate 5 are rounded to fit within the rib 31, and formed thereon is a lug 37 so shaped and positioned that the recess 38 between it and the rib 39 is substantially the same shape as lug 32 on link 1. This recess is sufficiently large to give clearance between the extreme point 40 and the end 41 of lug 32 that the links may assume a reasonable angle with reference to each other. During such movement the rounded end 42 of lug 37 rolls in the recess 34. The two side bars 5 are held on the link 1 by means of a bolt 8.

A traction belt when first used will develop a certain amount of stretching. In order to overcome this slack I provide a rod 12 connecting shaft 20 of sprocket 11 and shaft 18 of the idler wheel 10. This rod is provided with bearings on each of these shafts and one end is slidable in an opening in one of the bearings, is threaded, and provided with a nut 14 by which the distance between the two shafts may be varied. The front wheel 10 is provided with a tread surface 16 adapted to rest on the upper surface of the link flanges 17 and 35. These treads are provided with flanges 43 to guide the links. The wheel 11 is provided with the usual sprocket teeth 44 adapted to drive against the cylindrical cross pieces 4 and also has a tread 45 on each side thereof adapted to rest on the flange members 17 and 35 of the chain links. This driving sprocket is revolubly mounted on the cross shaft 20, which latter is held rigidly on the main frame. The sprocket is provided with an extending sleeve whereon is mounted a similar tooth sprocket 46 driven by chain 31 from the engine shaft. Although I have illustrated this form of drive, it will be understood that any suitable drive may be employed.

A supporting roller 22 is journaled on pin 25 held in a frame 26, this frame being attached to the tractor frame 47. The roller 22 is the full width of the traction chain and is adapted to carry the weight of the tractor between the driving sprocket and the idler wheel.

This application is drawn particularly with reference to the construction of the traction links and to the method in which they are constructed and held together, and while I have shown the preferred embodiment of my invention it will be understood that minor changes may be made in detail and design without departing from the scope of the claims.

Having thus described this invention, what is claimed and desired to protect by Letters Patent is:—

1. A belt comprising pairs of links, one link having side bars, connecting bars, and end lugs, formed integral, the other set of links consisting of side bars terminating in end lugs for intermeshing engagement with the lugs of the first set of links, and bolts detachably connecting the side bars of the said other set of links.

2. A belt comprising links and connectors therefor, the links having side bars provided with means for detachably connecting the same in spaced parallel relation, and the ends of the side bars having lugs, the connectors consisting of side bars, connecting bars and end lugs for intermeshing engagement with the lugs of the side bars of the links.

3. A belt comprising links and connectors therefor, the links having side bars and means for separably connecting the bars in spaced parallel relation, the connectors having integral side bars and connecting bars for the side bars, said links and connectors having their end portions shaped for interlocking pivotal engagement.

4. An endless traction belt comprising a plurality of pairs of links, one link of said pair comprising side bars and cylindrical integrally formed cross bars, the other link of said pair comprising separate side bars, hook shaped lugs formed on said first-mentioned links and substantially hook shaped lugs formed on said second-mentioned link, said lugs being adapted to interlock and hold said links in longitudinal relation.

5. A link belt comprising a plurality of pairs of links, one link of each pair comprising side bars and cylindrical cross bars formed integrally, hook shaped lugs formed on the outer faces of said side bars at each end thereof, the lugs of one set of bars having the recesses in the hook portion opening toward each other and the bottom of said recess being in alinement with the axes of said cross bars, the other link of each pair having independent side bars, lugs formed on the inner faces of said side bars and having recesses adapted to receive the lugs of the adjacent link, and lugs formed on said side bars having a rounded end adapted to seat in the recess of the lug of said first-mentioned link and form a rolling contact therewith.

6. A belt comprising links, connectors therefor, the links having the inner surfaces of the ends of their sides channeled and provided with lugs, connectors having the outer surface of the ends of their sides channeled and provided with lugs for overlapping intermeshing engagement with the lugs and channels of the links.

In testimony whereof I affix my signature in presence of two witnesses.

EDWARD F. SULLIVAN.

Witnesses:
R. M. OYARZO,
W. A. STOCK.